United States Patent
Schuler

(10) Patent No.: US 7,279,055 B2
(45) Date of Patent: Oct. 9, 2007

(54) METHOD FOR THE ROTATIONAL FRICTION WELDING OF PLASTIC PARTS AND DEVICE FOR CARRYING OUT THE METHOD

(75) Inventor: Tobias Schuler, Reutlingen (DE)

(73) Assignee: Bielomatik Leuze GmbH & Co KG, Neuffen (DE)

( * ) Notice: Subject to any disclaimer, the term of this patent is extended or adjusted under 35 U.S.C. 154(b) by 0 days.

(21) Appl. No.: 11/077,059

(22) Filed: Mar. 10, 2005

(65) Prior Publication Data
US 2005/0205194 A1 Sep. 22, 2005

(30) Foreign Application Priority Data
Mar. 16, 2004 (DE) .................. 10 2004 013 836

(51) Int. Cl.
B32B 37/00 (2006.01)
(52) U.S. Cl. .................. 156/64; 156/73.5; 156/358; 156/580
(58) Field of Classification Search .................. 156/64, 156/73.5, 73.6, 358, 580; 264/68; 228/112.1, 228/2.1, 2.3
See application file for complete search history.

(56) References Cited

U.S. PATENT DOCUMENTS

| | | | |
|---|---|---|---|
| 3,290,198 A | | 12/1966 | Lux et al. |
| 3,468,732 A | * | 9/1969 | Hewitt .................. 156/73.5 |
| 3,899,378 A | | 8/1975 | Wragg et al. |
| 3,954,215 A | * | 5/1976 | Takagi et al. .................. 228/2.3 |
| 4,721,546 A | | 1/1988 | Clark et al. |
| 4,741,788 A | | 5/1988 | Clark et al. |
| 4,743,331 A | | 5/1988 | Nuttall et al. |
| 6,001,202 A | * | 12/1999 | Penttila et al. .................. 156/73.5 |

FOREIGN PATENT DOCUMENTS

| | | |
|---|---|---|
| DE | 1 813 305 | 12/1969 |
| DE | 79 11 501 U1 | 4/1979 |
| JP | 04-131225 A | 5/1992 |

* cited by examiner

Primary Examiner—James Sells
(74) Attorney, Agent, or Firm—Flynn, Thiel, Boutell & Tanis, P.C.

(57) ABSTRACT

Method and device for the rotational friction welding of plastic parts.

Figure 1:
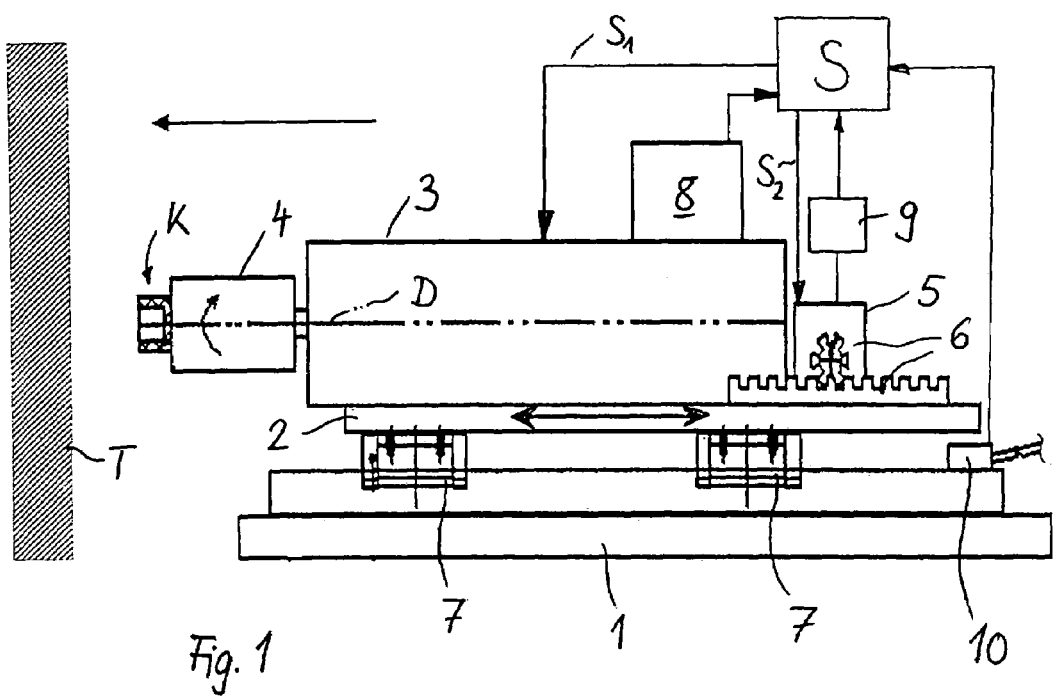

A method for the rotational friction welding of plastics wherein a rotationally symmetrical plastic body is set in rotation and, as it rotates, is pressed against a welding location of a plastic part that is held stationary until plastification of the pressing surfaces of the plastic part and/or the plastic body is achieved, and wherein the rotationally symmetrical plastic body is braked to a standstill after plastifying and is held pressed against the stationary plastic part until the plastified pressing surfaces solidify, is known.

According to the invention, the rotationally symmetrical plastic body is pressed at a circumferential speed of more than 7 m/s and a pressing pressure of less than 0.5 N/mm² against the welding location of the plastic part that is held stationary.

Use for plastic tanks.

7 Claims, 1 Drawing Sheet

METHOD FOR THE ROTATIONAL FRICTION WELDING OF PLASTIC PARTS AND DEVICE FOR CARRYING OUT THE METHOD

The invention relates to a method for the rotational friction welding of plastic parts, a rotationally symmetrical plastic body being set in rotation and, as it rotates, pressed against a welding location of a plastic part that is held stationary until plastification of pressing surfaces of the plastic part and/or the plastic body is achieved and the rotationally symmetrical plastic body being braked to a standstill after plastifying and held pressed against the stationary plastic part until the plastified pressing surfaces solidify, and also relates to a device for carrying out such a method, a rotational drive unit equipped with a receiving arrangement for the rotationally symmetrical plastic body being provided, and an adjusting device being provided for pressing the rotationally symmetrical plastic body against the welding location of the stationary plastic part, which adjusting device adjusts the receiving arrangement in a translatory manner orthogonally in relation to the pressing surfaces of the plastic body and the plastic part.

The rotational friction welding of thermoplastic materials in mass production is generally known from the guideline DVS 2218 Part 1 (July 1993) issued by the Deutsche Verband für Schweißtechnik e.V. [German association for welding engineering]. This involves clamping the plastic parts to be welded respectively in a tool. One of the two plastic parts is of a rotationally symmetrical form and is held in a rotatable receiving tool. For a welding operation, the receiving tool is set in rotation. Subsequently, the two plastic parts are displaced axially in relation to each other, the rotating receiving tool preferably being displaced axially toward the stationary tool. The joining surfaces to be welded to each other of the rotating plastic part and the stationary plastic part inevitably make contact with each other as a result of the axial displacement. As a result of the axial displacement, after contact an axial pressure is applied to the joining surfaces, whereby a plastification of the polymer material is achieved on account of the interfacial friction and the heating caused by shearing within the plastics. This produces a weld bead. The rotational drive is then brought to a standstill, while an axial pressure continues to be applied to the joining surfaces until the plastified regions of the plastic parts have solidified.

Until now, rotational friction welding was not suitable for certain applications since considerable formation of fluff occurred during the frictional phase in which complete plastification had not yet come about. The fluff produced could not be removed in subsequent working steps, or only with considerable effort. Therefore, rotational friction welding did not appear to be suitable for various applications. Heated tool welding preferred here over rotational friction welding.

The object of the invention is to provide a method and a device of the type stated at the beginning by which the formation of fluff can be considerably reduced or avoided entirely.

This object is achieved for the method by the rotationally symmetrical plastic body being pressed at a circumferential speed of more than 7 m/s and a pressing pressure of less than 0.5 N/mm² against the welding location of the plastic part that is held stationary. The stationary holding of the plastic part means that it is held so as not to rotate. However, the plastic part may be held in such a way that it is axially displaceable. The rotatable plastic body may—depending on the embodiment—be held in such a way that it is axially displaceable or axially fixed. The plastic part and the plastic body may either both be moved axially toward each other by means of their corresponding receiving tools, or one of the two receiving tools is held in such a way that it is axially fixed and the other receiving tool is displaced axially in relation to the fixed receiving tool. The solution according to the invention has surprisingly achieved the effect that formation of fluff is at least largely avoided and, as a result, extremely clean welds are achieved. The solution according to the invention makes it possible to use rotational friction welding also for applications in which previously only heated tool welding has appeared to be suitable. Since rotational friction welding ensures a much faster process, considerably greater cost-effectiveness in the mass production of plastic parts is obtained by the invention. The solution according to the invention is particularly suitable for welding plastic parts of all kinds to fuel tanks for motor vehicles. Preferred plastic bodies are connecting and ventilating pieces, fastening and holding elements and the like. According to the invention, the pressing pressure described is intended to mean the pressure applied during the rotating phase of the plastic body. During the subsequent standstill phase, the pressing pressure, which is maintained during the solidifying phase of the plastified region, is higher. The increase is preferably in the range from 30 to 50% of the pressing pressure during the rotating phase. Preferably both the pressing pressure during the rotating phase and the pressing pressure during the standstill phase are respectively kept constant.

In a refinement of the invention, the circumferential speed is chosen to be greater than 11 m/s. Preferably, moreover, the pressing pressure is chosen to be less than or equal to 0.1 N/mm².

In a further refinement of the invention, a pressing force of the plastic body and the plastic part against each other is controlled so as to be constant. The force control ensures maintenance of a constant pressing force with great accuracy. Preferably a two-stage force control takes place. During a first stage, in which the plastic body is in rotation, the force is lower than in the subsequent plastifying or standstill phase, in which the incipiently melted regions solidify.

For the device, the object on which the invention is based is achieved by the receiving arrangement being connected in a rotationally fixed manner to a drive shaft of a servomotor, which is part of the rotational drive unit, and the adjusting device has a servomotor which is in operative connection with the receiving arrangement by means of a rotary/translatory transmission unit. Servomotors are exactly controllable electric motors which behave dynamically, precisely and with overload capability in a great speed control range. Their preferred dynamic properties are a low moment of inertia, a high accelerating torque and smooth, concentric running even at the lowest rotational speeds. A servomotor allows particularly rapid acceleration and braking and good accuracy in reaching target positions to be achieved. Moreover, the servomotor has a static torque. The servomotor is preferably a permanently excited synchronous motor which for sensing the rotor position requires a simple position encoder with six position indications per revolution. Since in the case of a servomotor positional sensing of the drive shaft, and in particular of the angle of rotation of the drive shaft, is possible, rotating welded parts can be braked to a standstill in a specific angular position. Provided in particular as the rotary/translatory transmission unit is a rack-and-pinion drive, in which a drive pinion of the servomotor meshes with a toothed rack which is fixedly connected to the axially displaceable receiving arrangement, in particular a receiving tool, for the plastic body. The toothed rack is aligned in the direction of axial displacement.

In a refinement of the invention, a sensor system for sensing a pressing force of the plastic body against the plastic part is provided, and the servomotor is assigned a closed-loop control unit, which controls the servomotor in such a way that a constant pressing force is achieved during the rotational friction welding operation. The sensor system preferably determines the pressing force at any given instant during the friction welding operation as an actual value and permanently compares these actual values with predetermined setpoint values in the closed-loop control unit. Depending on the result of the comparison, the servomotor is correspondingly activated. The pressing force can be sensed by direct or indirect measured variables. Preferred indirect measured variables are electric current measurements at the servomotor. An increase in current is proportional to an increase in the pressing force. Conversely, a reduction in current is correspondingly proportional to a reduction in the pressing force. With the cross-sectional ratio in the region of the weld remaining the same, the constant pressing force also achieves the effect of a constant pressing pressure, whereby a particularly good welded joint is achieved.

In a further refinement of the invention, an electronic open-loop control unit is provided, which controls the servomotors of the rotational drive unit and of the adjusting device during a rotational friction welding operation in such a way that the plastic body has a circumferential speed of more than 7 m/s, preferably more than 11 m/s, and a pressing pressure against the plastic part of less than 0.5 N/mm$^2$, preferably less than or equal to 0.1 N/mm$^2$. The electronic open-loop control unit permits central and automatic open-loop and closed-loop control of the friction welding operations. The electronic open-loop control unit preferably has a comparator and an evaluation unit, which compares and evaluates corresponding setpoint and actual values, in particular with respect to controlling the pressing force, and transforms them into corresponding control commands for the servomotors.

The object of the invention is also to improve a rotational friction-welded joint between a rotationally symmetrical plastic body and a plastic part to the extent that an at least virtually completely plastified weld with at most little formation of fluff is achieved.

This object is achieved according to the invention by the plastic body having an end rim which in cross section tapers to a point and which in the welded state enters into a conical weld with the plastic part. The tapering end rim has the effect that, during the axial displacement of the plastic body and the plastic part in relation to each other at the beginning of a rotational friction welding operation, substantially linear contact is obtained with the rotationally symmetrical plastic body as soon as the plastic body encounters the plastic part as it rotates. On account of the greatly reduced cross-sectional area in the region of the end rim, there is a specifically higher pressure at the beginning of the frictional phase, even if the pressing force is kept constant during the entire rotational friction welding operation. This makes it possible for the frictional phase to be greatly reduced in time and for plastification to be achieved relatively quickly. The fact that only substantially linear contact takes place at the beginning of the frictional operation means that there is a greatly reduced frictional area, which inevitably results in reduced formation of fluff.

Further advantages and features of the invention emerge from the claims and also from the following description of a preferred exemplary embodiment of the invention, which is presented on the basis of the drawings.

Figure 2:
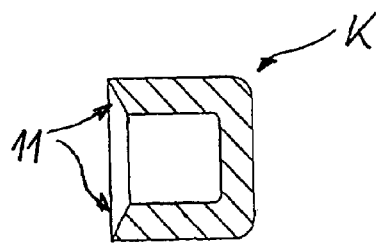

FIG. 1 schematically shows an embodiment of a device according to the invention for the rotational friction welding of plastic parts in a side view and FIG. 2 shows a rotationally symmetrical plastic body which is used for rotational friction welding by means of the device according to FIG. 1 in an enlarged cross-sectional representation.

By means of a device according to FIG. 1, which is described in more detail below, a rotationally symmetrical plastic body K (FIG. 2) is joined by rotational friction welding to a welding area (not designated any more specifically) of a plastic part T that is held stationary. In the case of the exemplary embodiment, both the plastic body K and the plastic part T consist of a thermoplastic material. Apart from thermoplastics, it is also possible for thermoplastic elastomers to be welded to one another or to thermoplastics by means of the rotational friction welding device that is represented in FIG. 1.

The plastic part T is held in a fixed, stationary manner by a suitable tool, in a way not represented in any more detail. In the case of the exemplary embodiment represented, the plastic part T is aligned in such a way that a front surface, which is directed toward the plastic body K and serves as a welding area at the height of the plastic body K, is aligned approximately vertically. The plastic body K is clamped with its axis of rotational symmetry coaxial to a horizontal axis of rotation D of a receiving tool 4 or releasably fixed in some other way. The receiving tool 4 is rotatable about the horizontal axis of rotation D in the way described in more detail below.

However, it is also possible to construct the device according to FIG. 1 in such a way that the axis of rotation D is approximately vertically aligned and the welding area, and consequently the front surface of the plastic part T, is held horizontally in a correspondingly modified receiving tool. In the case of such an embodiment, it would be adequate for a schematic representation simply to turn the drawing according to FIG. 1 by 90° in order to achieve the alignment described.

The receiving tool 4 for the rotationally symmetrical plastic body K is held in such a way that it is rotationally fixed with a drive shaft (not designated any more specifically) of a servomotor 3. The servomotor 3 is fastened on a carriage 2, which is held on a base frame 1 in such a way that it can be axially displaced by means of a carriage guide 7 in the direction of the double-headed arrow. The base frame 1 has at least one guide rail, in order to permit the linear mobility, and consequently axial displaceability, of the carriage guide 7 and of the carriage 2. The guide arrangement formed by the carriage guide 7 and the at least one guide rail serves on the one hand for guiding the linear movement, i.e. the axial displacement, of the carriage 2. On the other hand, the guide arrangement serves for absorbing transverse forces which occur during the various phases of the rotational friction welding operation.

To permit an exactly controlled axial displacement of the carriage 2, and consequently also of the servomotor 3, an adjusting device 5, 6 is provided. Serving as the adjusting drive is a servomotor 5, which is fastened on the base frame 1 in a way not represented any more specifically. In order to transmit the rotational movement of a drive shaft of the servomotor 5 into a translatory control movement of the carriage 2, a rack-and-pinion drive 6 is provided as the transmission unit. The rack-and-pinion drive 5 has a pinion which is fastened on a drive shaft of the servomotor 5. The drive shaft of the servomotor 5 is aligned orthogonally in relation to the axis of rotation D of the receiving tool 4, and consequently also orthogonally in relation to the drive shaft of the servomotor 3, and in the representation according to FIG. 1 protrudes perpendicularly out of the plane of the drawing. The pinion of the rack-and-pinion drive 6 meshes with a straight toothed rack which is fastened on the carriage 2 along the direction of axial displacement. The toothed rack of the rack-and-pinion drive 6 is consequently aligned parallel to the axis of rotation D. The rack-and-pinion drive 6 is formed in such a way that it permits at least largely play-free force transmission.

To allow displacing movements of the carriage 2, and consequently of the servomotor 3 and of the plastic body K, to be sensed, a displacement measuring system 10 is provided.

For central open-loop control and/or closed-loop control both of the displacement travel and of a circumferential speed of the plastic body K, a central electronic open-loop control unit S is provided, to which the displacement measuring system 10 is connected in such a way that the central open-loop control unit S can sense and process corresponding displacement signals of the displacement measuring system 10. The servomotor 3 has a revolution counter 8 and the servomotor 5 has an electric current meter 9, required for pressing force control, which are both connected to the central open-loop control unit S in order to permit open-loop and/or closed-loop control of the servomotors 3, 5 by the central open-loop control unit S. For this purpose, the central open-loop control unit S is connected with the aid of control lines $S_1$, $S_2$ to the servomotor 3 and the servomotor 5, respectively. Moreover, data on the dimensions of the plastic body, and in particular its diameter and radius, are stored in the central open-loop control unit S. Data of the transmission unit, such as the transmission ratio and the like, are also stored. As a result, it is possible on the one hand for the central open-loop control unit S to control the circumferential speed of the plastic body K exactly.

The electric current meter 9 represents a force sensor which senses current peaks, caused by an increased torque of the servomotor 5, indirectly by permanent sensing of the current data at any given instant during the rotational friction welding operation. As a result, it is possible for the open-loop control unit S to reach conclusions concerning the pressing force of the plastic body K on the plastic part T. By means of corresponding data memory areas and comparisons between actual values and setpoint values, the central open-loop control unit S can control the pressing force of the plastic body K on the plastic part T, and consequently also the pressing pressure. A constant force control is preferably performed.

The device is designed in such a way that the servomotor 3 drives the plastic body K with a circumferential speed of more than 7 m/s, preferably with a circumferential speed of more than 11 m/s. The pressing pressure of the plastic body K on the plastic part T that is achieved by the servomotor 5 during the rotational friction welding operation is preferably chosen to be extremely low and is at most 0.1 N/mm². In any event, the pressing pressure is to be less than 0.5 N/mm². The pressing force necessary for this pressing pressure is achieved by the corresponding control of the servomotor 5, the open-loop control unit S performing a constant force control.

As can be seen from FIG. 2, the plastic body K has an end rim 11, the end face of which is conically beveled. The end rim consequently tapers to a point and forms a peripheral, sharp end edge and on this end edge forms a circular line for rotating contact with the plastic part.

For the beginning of a rotational friction welding operation, the clamped plastic body K is set in rotation, in that the servomotor 3 starts up and sets the receiving tool 4 to the rotational speed that corresponds to the desired circumferential speed for the end edge of the end rim 11 of the plastic body K. Subsequently, the carriage 2 is displaced axially toward the plastic part T by means of the servomotor 5 and the rack-and-pinion drive 6. The axial displacement causes the plastic body K to make contact at its described circumferential speed with the surface of the plastic part T. The frictional phase begins. Since the axial pressure on the plastic body K is maintained during the frictional phase, the corresponding pressing surfaces of the plastic part T and the plastic body K are heated and incipiently melted by interfacial friction and heating caused by shearing.

The constant pressing pressure produces a weld bead. As soon as adequate plastification and weld bead formation has been achieved, the servomotor 3 is braked to a standstill. The pressing pressure by the servomotor 5 is now increased to the preferred, likewise constant pressure for the standstill phase. The pressure lies about 30 to 50% above the pressing pressure during the rotating phase. This pressure is maintained until the plastified regions of the plastic body K and of the plastic part T in the region of the weld bead have solidified. Then the receiving tool 4 releases the plastic body K. The carriage 2 returns to its starting position. The rotational friction welding operation is completed.

The invention claimed is:

1. Method for the rotational friction welding of plastic parts, comprising providing a rotationally symmetrical plastic body having an end rim which in cross section tapers to a point, the plastic body being set in rotation and, as it rotates, pressed against a welding location of a plastic part that is held stationary until plastification of pressing surfaces of the plastic part and/or the plastic body is achieved and the rotationally symmetrical plastic body being braked to a standstill after plastifying and held pressed against the stationary plastic part until the plastified pressing surfaces solidify into a conical weld, wherein the rotationally symmetrical plastic body is pressed at a circumferential speed of more than 7 m/s and a pressing pressure of less than 0.5 N/mm² against the welding location of the plastic part that is held stationary.

2. Method according to claim 1, wherein the circumferential speed is chosen to be greater than 11 m/s.

3. Method according to claim 1, wherein the pressing pressure is chosen to be less than or equal to 0.1 N/mm².

4. Method according to claim 1, wherein a pressing force of the plastic part and the plastic body against each other is controlled so as to be constant.

5. System for carrying out a method for the rotational friction welding of a rotationally symmetrical plastic body having an end rim which in cross section tapers to a point and which in the welded state enters into a conical weld with a plastic part, the plastic body being set in rotation and, as it rotates, pressed against a welding location of said plastic part that is held stationary until plastification of pressing surfaces of the plastic part and/or the plastic body is achieved, and the rotationally symmetrical plastic body being braked to a standstill after plastifying and held pressed against the stationary plastic part until the plastified pressing surfaces solidify, a rotational drive unit equipped with a receiving arrangement for the rotationally symmetrical plastic body being provided, and an adjusting device being provided for pressing the rotationally symmetrical plastic body against the welding location of the stationary plastic part, which adjusting device adjusts the receiving arrangement in a translatory manner orthogonally in relation to the pressing surfaces of the plastic body and the plastic part, comprising the receiving arrangement being connected in a rotationally fixed manner to a drive shaft of a servomotor, which is part of the rotational drive unit, and the adjusting device having a servomotor which is in operative connection with the receiving arrangement by means of a rotary/translatory transmission unit.

6. System according to claim 5, further comprising a sensor system for sensing a pressing force of the plastic body against the plastic part, wherein the servomotor is assigned a closed-loop control unit, which controls the servomotor in such a way that a constant pressing force is achieved during the rotational friction welding operation.

7. System according to claim 6, further comprising an electronic open-loop control unit, which controls the servomotors of the rotational drive unit and of the adjusting device during a rotational friction welding operation in such a way that the plastic body has a circumferential speed of more than 7 m/s, preferably more than 11 m/s, and a pressing pressure against the plastic part of less than 0.5 N/mm$^2$, preferably less than or equal to 0.1 N/mm$^2$.

* * * * *